United States Patent [19]

Sato

[11] Patent Number: 5,673,192
[45] Date of Patent: Sep. 30, 1997

[54] ELECTRICAL EQUIPMENT CONTROL SYSTEM FOR A VEHICLE UTILIZING ONE CENTRAL PROCESSING UNIT

[75] Inventor: Morio Sato, Saitama, Japan

[73] Assignee: Honda Giken Kogyo Kabushiki Kaisha, Tokyo, Japan

[21] Appl. No.: 703,834

[22] Filed: Aug. 27, 1996

Related U.S. Application Data

[63] Continuation of Ser. No. 213,748, Mar. 16, 1994, abandoned.

[30] Foreign Application Priority Data

Mar. 17, 1993  [JP]  Japan  ................................. 5-057512

[51] Int. Cl.$^6$ ................................................. B60K 31/02
[52] U.S. Cl. ................................................. 364/424.045
[58] Field of Search ............................. 364/431.12, 550, 364/559, 424.045, 423.098; 80/79.1; 324/381

[56] References Cited

U.S. PATENT DOCUMENTS

| | | | |
|---|---|---|---|
| 3,651,454 | 3/1972 | Venema et al. | 340/459 |
| 3,864,578 | 2/1975 | Lackey | 307/10.1 |
| 4,306,218 | 12/1981 | Leconte et al. | 340/468 |
| 4,385,278 | 5/1983 | Sterling | 324/381 |
| 4,800,974 | 1/1989 | Wand et al. | 180/79.1 |
| 4,825,362 | 4/1989 | Minami et al. | |
| 4,939,675 | 7/1990 | Luitje | 364/550 |
| 4,996,657 | 2/1991 | Shiraishi et al. | 364/559 |
| 5,079,708 | 1/1992 | Brown | 364/424.05 |
| 5,091,858 | 2/1992 | Paielli | 364/431.12 |
| 5,189,617 | 2/1993 | Shiraishi | 364/424.05 |

FOREIGN PATENT DOCUMENTS

| | | |
|---|---|---|
| 467512 | 1/1992 | European Pat. Off. . |
| 470056 | 2/1992 | European Pat. Off. . |
| 62-18150 | 1/1987 | Japan . |
| 4207429 | 7/1992 | Japan . |
| 2142175 | 1/1985 | United Kingdom . |
| 2240865 | 8/1991 | United Kingdom . |

OTHER PUBLICATIONS

Osborne 16-BIT Microprocessor Handbook, pp. 6–19, 1980.

Hitachi Microcomputer Data Book, p. 820, 1982.

Micro-computer Architecture and Programming, Fig. 10–1.

*Primary Examiner*—Kevin J. Teska
*Assistant Examiner*—Dan Fiul
*Attorney, Agent, or Firm*—Birch, Stewart, Kolasch & Birch, LLP

[57] ABSTRACT

A centralized electrical equipment control system controls the electrical equipment of a vehicle and provides the capability of reducing the manufacturing cost while facilitating the modification and development of the electrical system of the vehicle. The electrical equipment control system has a central control unit including a microcomputer and a communication circuit. The microcomputer exchanges data through the communication circuit via a communication network with respective communication circuits of an ignition I/O unit, a meter I/O unit and a flasher I/O unit to control the I/O units. The electrical equipment control system utilizes only a single microcomputer and a simple I/O port and is thus capable of reducing the manufacturing costs of the electrical equipment.

19 Claims, 12 Drawing Sheets

FIG. 11
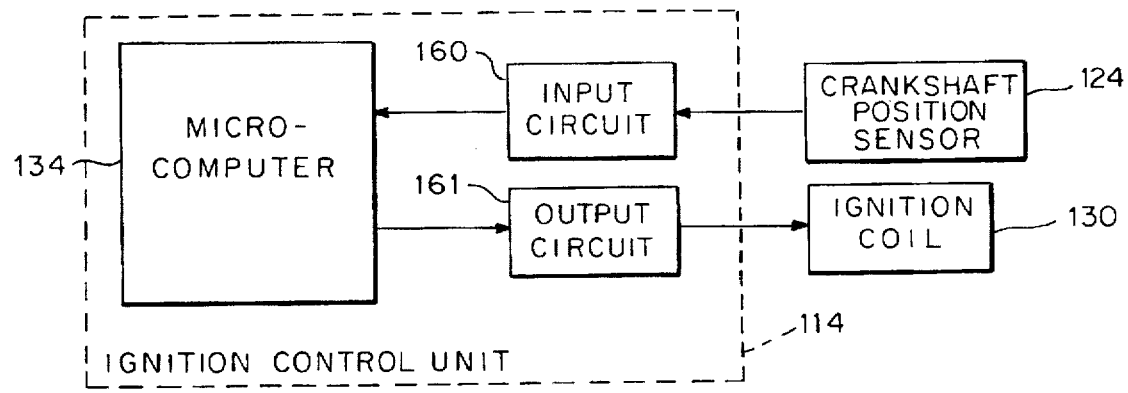
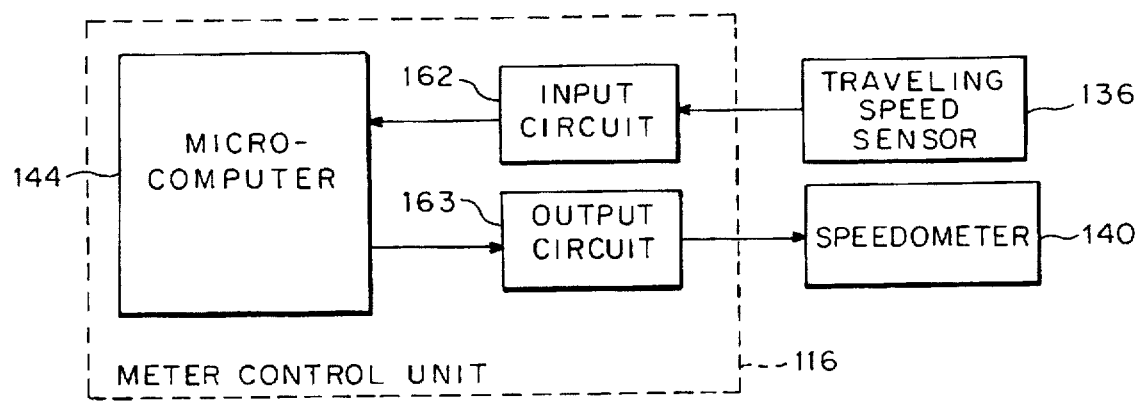
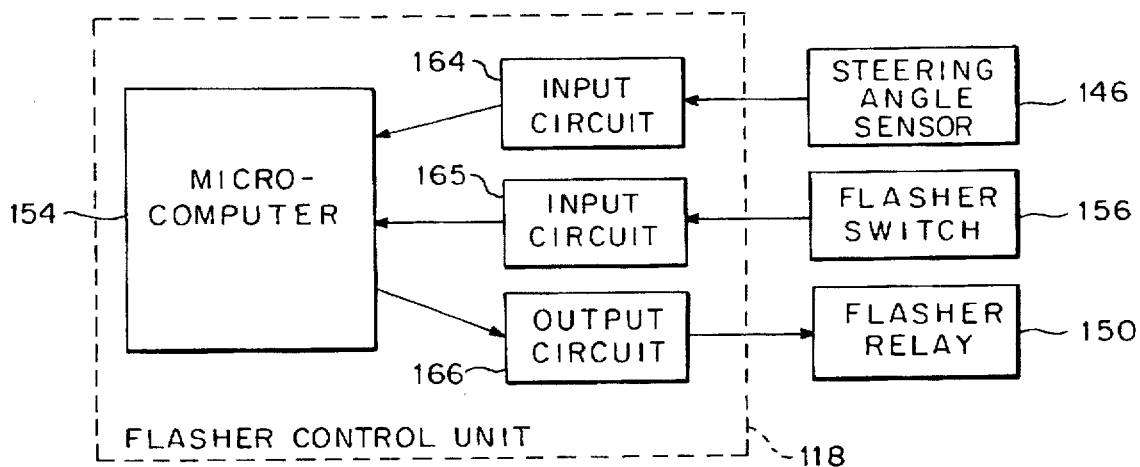

ELECTRICAL EQUIPMENT CONTROL SYSTEM FOR A VEHICLE UTILIZING ONE CENTRAL PROCESSING UNIT

This application is a continuation of application Ser. No. 08/213,748 filed on Mar. 16, 1994, now abandoned.

BACKGROUND OF THE INVENTION

1. Field of the Invention

The present invention relates to an electrical equipment control system and, more specifically, to an electrical equipment control system having a single central processing unit capable of controlling a plurality of electric devices of a vehicle.

2. Description of the Background Art

A vehicle is provided with a plurality of electric devices including ignition plugs, a speedometer and flashers, and these electric devices are controlled by a microcomputer.

As shown in FIG. 11 by way of example, a conventional control system for controlling the electric devices of a vehicle has a plurality of control units 114, 116 and 118 for ignition, meter and flasher control, each provided with respective microcomputers. For example, crankshaft position sensor 124 and ignition coil 130 are respectively coupled through input circuit 160 and output circuit 161 to microcomputer 134 of ignition control unit 114. Similarly, traveling speed sensor 136 and speedometer 140 are respectively coupled through input circuit 162 and output circuit 163 to microcomputer 144 of meter control unit 116. Also, steering angle sensor 146, flasher switch 156 and flasher relay 150 are respectively coupled through input circuits 164 and 165 and output circuit 166 to microcomputer 154 of flasher control unit 118.

As shown in FIG. 12, in a control system provided with a single microcomputer for controlling a plurality of electrical units, each of the ignition control systems 114, the meter control system 116 and the flasher control system 118 are connected through various respective input and output circuits 160–166 (hereinafter referred to as "I/O port") to microcomputer 174 of the central control unit 180.

The conventional control system of FIG. 11 having a plurality of control units each provided with a microcomputer therefore requires a plurality of microcomputers, which increases the cost of the control system.

The conventional control system of FIG. 12 provided with a single microcomputer for controlling a plurality of electrical units needs a large-scale I/O port and hence a large printed wiring board. Many lines connecting the sensors and the controlled devices to the I/O port are therefore concentrated in areas around the microcomputer to make the layout of a connector for connecting the I/O port and the lines difficult. In most cases, the central control unit having such a configuration must be changed entirely when the control system is modified or electric devices are added, which reduces the efficiency of developing activities.

SUMMARY OF THE INVENTION

The present invention has been made to solve such problems of the conventional control systems and it is therefore an object of the present invention to provide an electrical equipment control system capable of suppressing the increase of the manufacturing costs of the electrical equipment of a vehicle, of readily coping with changes in the specifications of the electrical equipment and of facilitating the development of the system.

To achieve this object, the present invention provides an electrical equipment control system for controlling a plurality of electric units incorporated into a vehicle, the system including:

a plurality of I/O devices having sensor output readers for reading the outputs of the sensors of the electrical equipment, input data producers for producing input data on the basis of the outputs of the sensor output readers, first communication units which transform the outputs of the input data producers into signals of a predetermined transmission format, deliver the signals of a predetermined transmission format to a data communication network and extract driving signals for driving the electrical equipment from input signals given thereto by the data communication network, and drivers for driving the electrical equipment on the basis of the driving signals extracted by the first communication units; and a central controller having a second communication unit connected through the data communication network respectively to the first communication units for mutual data communication with the first communication units and a controller for controlling the electrical equipment through the second communication units.

In the electrical equipment control system in accordance with the present invention, the input data producer produces input data on the basis of the outputs of the sensors read by the sensor output readers of each I/O device, and the first communication unit transforms the input data into signals of a predetermined transmission format and delivers the signal of the predetermined transmission format to the data communication network. The control unit of the central controller reads the signal through the second communication unit and produces control signals for controlling the electrical equipment on the basis of the signal and provides the control signals through the second communication unit to the data communication network. The first communication units extract driving signals for driving the electrical equipment from the signals received from the data communication network and delivers the driving signals to the drivers. Accordingly, the central controller is able to communicate through the data communication network with the plurality of I/O devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. For example, the present invention can be used with any control system and is not limited to a vehicular control system.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 11 is a block diagram of a conventional electrical equipment control system for controlling the electrical equipment of a vehicle.

DETAILED DESCRIPTION OF THE PREFERRED EMBODIMENTS

An electrical equipment control system of a preferred embodiment according to the present invention will be described in detail hereinafter with reference to the accompanying drawings.

Figure 1:
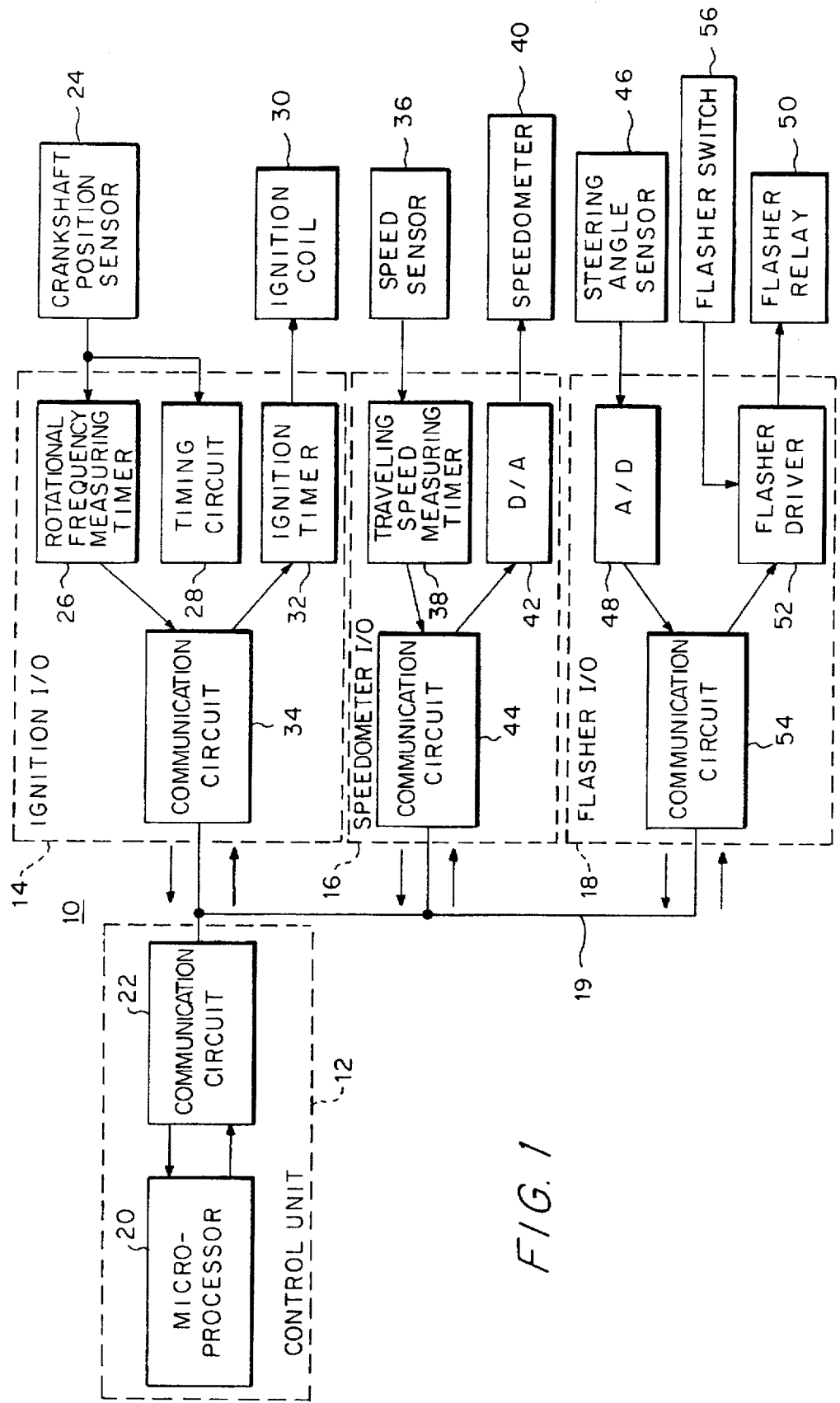
FIG. 1 is a block diagram of an electrical equipment control system of an embodiment of the present invention for controlling the electrical equipment of a vehicle.

FIG. 1 is a block diagram of an electrical equipment control system 10 embodying the present invention. The electrical equipment control system 10 for a vehicle comprises a central control unit 12, I/O units, i.e., an ignition I/O unit 14, a speedometer I/O unit 16 and a flasher I/O unit 18, and a communication network 19 connecting the central control unit 12 and the I/O units 14, 16 and 18 for communication. The central control unit 12 comprises a microcomputer 20 and a communication circuit 22.

The ignition I/O unit 14 comprises a rotational frequency measuring timer 26 which records periodic signals representing the rotational frequency of the crankshaft provided by a crank position sensor 24, a timing signal producing circuit 28 which produces an ignition timing signal for timing the igniting operation of the spark plugs, an ignition timer 32 which applies an ignition signal to the ignition coil on the basis of the ignition timing signal provided by the timing signal producing circuit 28, and a communication circuit 34 which converts a crankshaft speed signal provided by the rotational frequency measuring timer 26 into a signal of a predetermined transmission format, delivers the signal of the predetermined transmission format to the communication network 19, and receives signals from the communication network 19.

The speedometer I/O unit 16 comprises a traveling speed measuring timer 38 which records a traveling speed signal provided by a traveling speed sensor 36, a digital-to-analog converter (hereinafter, referred to as "D/A converter") 42 which converts a digital signal for driving the speedometer indicator 40 into a corresponding analog signal, and a communication circuit 44 which transforms the traveling speed signal provided by the traveling speed measuring timer 38 into a signal of a predetermined transmission format, delivers the signal of the predetermined transmission format to the communication network 19 and receives signals from the communication network 19.

The flasher I/O unit 18 comprises an analog-to-digital converter (hereinafter referred to as "A/D converter") 48 which converts a steering angle signal provided by a steering angle sensor 46 into a corresponding digital signal, a flasher driver 52 for driving a flasher relay 50 for turning on and off the flasher lamps, and a communication circuit 54 which transforms the steering angle signal into a signal of a predetermined transmission format, delivers the signal of the predetermined transmission format to the communication network 19 and receives signals from the communication network 19. The output signal of a manual flasher switch 56 for actuating and stopping the flasher relay 50 is delivered to the flasher driver 52.

Figure 2:
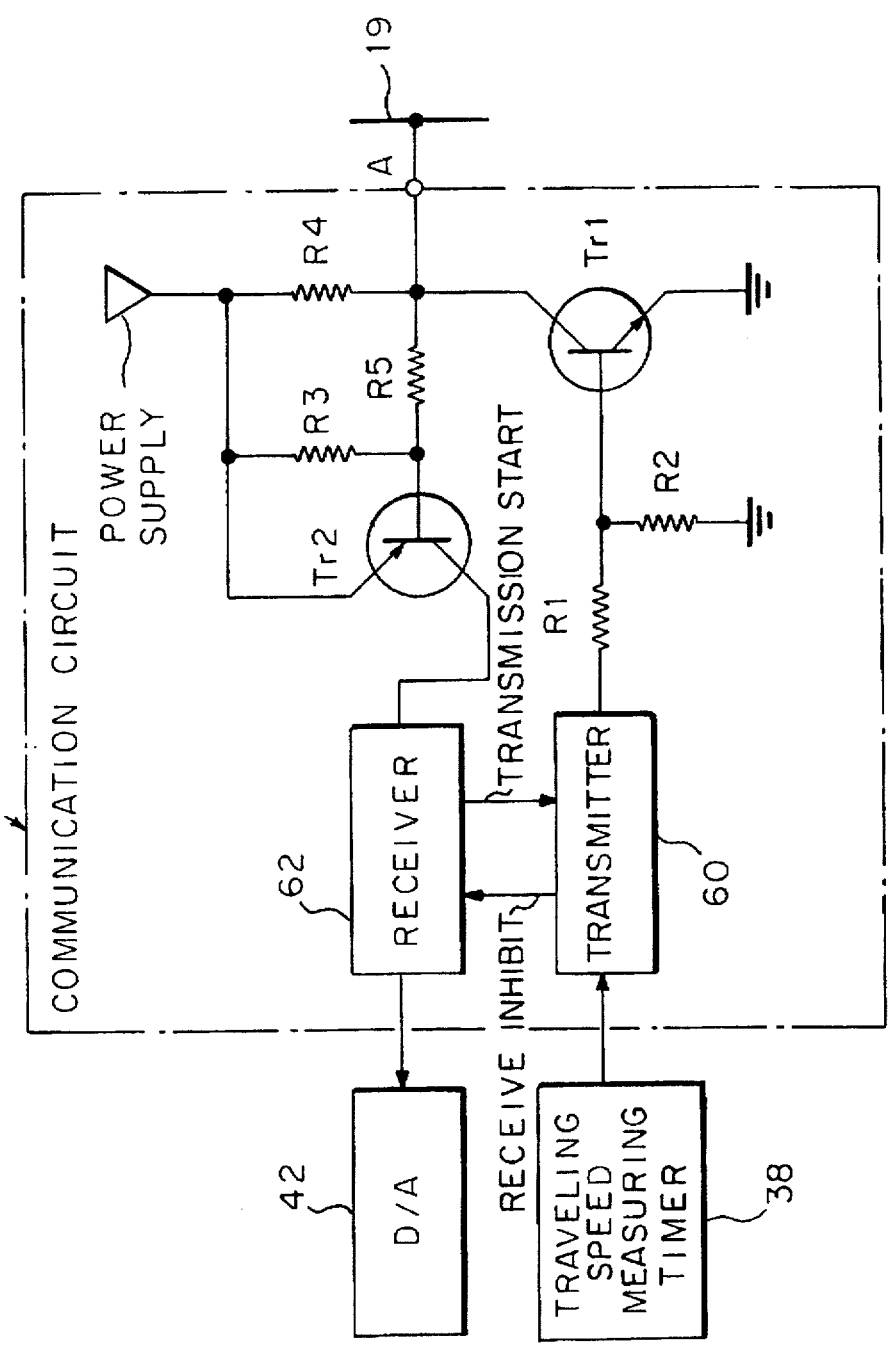
FIG. 2 is a block diagram of the communication circuit included in each of I/O units included in the electrical equipment control system of FIG. 1.

FIG. 2 is a block diagram of the communication circuit 44. The communication circuits 34 and 54 are of the same configuration as the communication circuit 44.

The communication circuit 44 comprises a transmitter 60 which transmits the traveling speed signal provided by the traveling speed measuring timer 38 to the communication network 19 and a receiver 62 which receives a signal to be delivered to the communication network 19 provided by the central control unit 12. The transmitter 60 has an output terminal through which to deliver a receive inhibit signal to the receiver 62 and the receiver 62 has an output terminal through which to deliver a transmitter start signal to the transmitter 60.

An NPN transistor $T_{r1}$ has a base terminal connected through a resistor R1 to the output terminal of the transmitter 60, a collector terminal connected to a communication signal I/O terminal A and an emitter terminal connected to the negative terminal of the power supply. The base terminal is connected through a resistor R2 to the negative terminal of a power supply. A PNP transistor $T_{r2}$ has a collector terminal connected to the input terminal of the receiver 62, an emitter terminal connected to the positive terminal of the power supply and a base terminal connected through a resistor R5 to the communication signal I/O terminal A. A resistor R3 is connected across the emitter terminal and the base terminal of the transistor $T_{r2}$. A resistor R4 has one end connected to the positive terminal of the power supply and the other end connected to the communication signal I/O terminal A.

Figure 3:
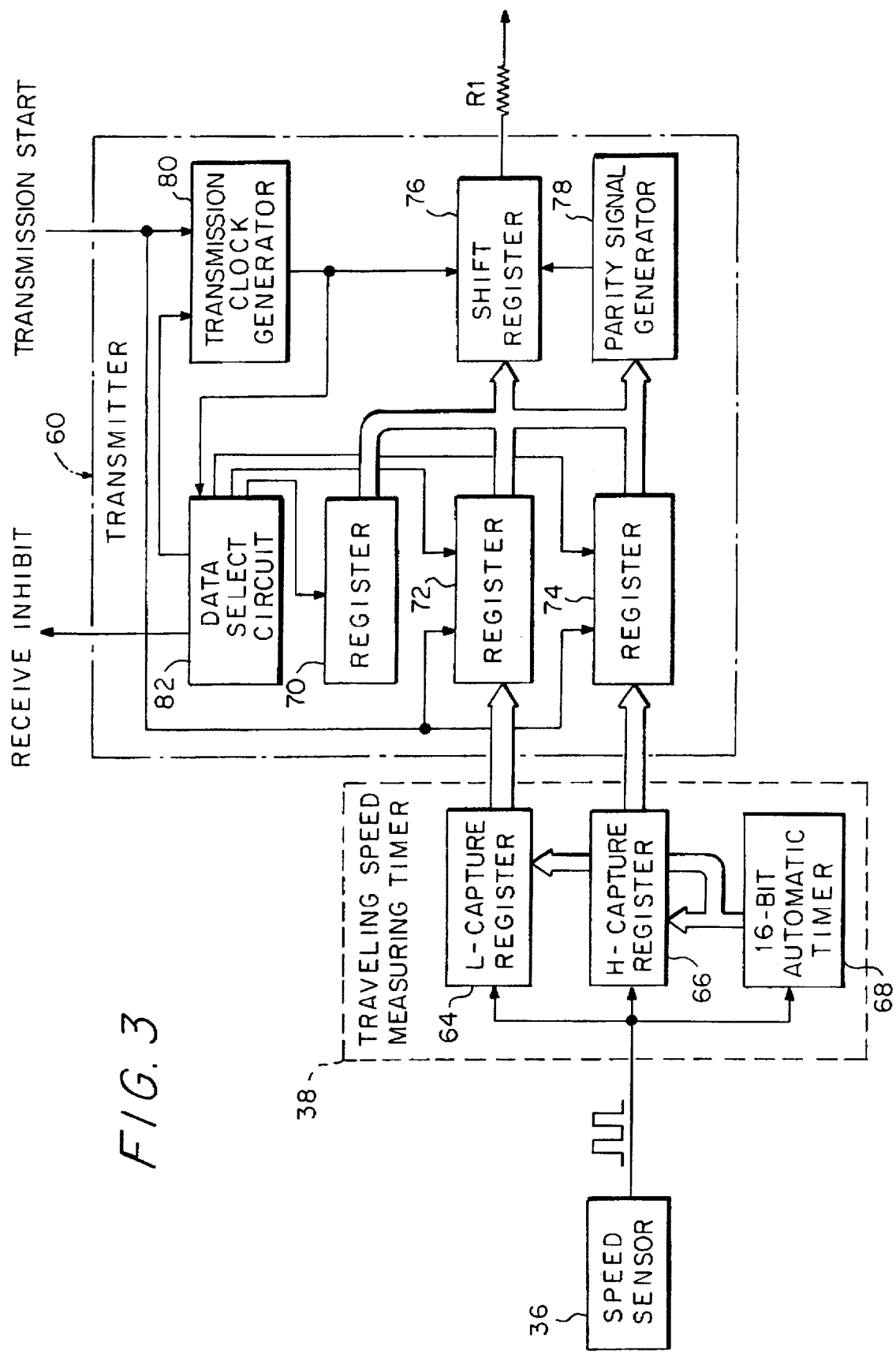
FIG. 3 is a block diagram of a transmitter included in the communication circuit of FIG. 2.

FIG. 3 is a block diagram of the traveling speed measuring timer 38 and the transmitter 60 of the communication circuit 44. The traveling speed measuring timer 38 comprises an L-capture register 64 which stores the lower eight bits of a traveling speed signal provided by the traveling speed sensor 36, an H-capture register 66 which stores the upper eight bits of the traveling speed signal provided by the traveling speed sensor 36 and a 16-bit automatic timer 68.

The transmitter 60 comprises a register 70 which stores a communication address signal consisting of a start bit, a receive address signal and a transmit address signal, a register 72 which stores a parallel signal provided by the L-capture register 64, a register 74 which stores a parallel signal provided by the H-capture register 66, a shift register 76 which transforms the communication address signal stored in the register 70 and the traveling speed signals stored in the registers 72 and 74 into a serial signal and delivers the serial signal to the communication network 19, and a parity signal generator 78 which provides a parity signal to the shift register 76. A transmission signal U to be delivered from the meter I/O unit 16 to the communication network 19 consists of the communication address signal and the traveling speed signals.

The transmitter 60 further comprises a transmission clock generator 80 which generates a transmission clock upon the reception of a transmission start signal from the receiver 62 and a data select circuit 82 which delivers a receive inhibit signal to the receiver 62 upon the reception of the transmission clock from the transmission clock generator 80 and delivers a clock signal to the registers 70, 72 and 74. The transfer of the contents of the registers 70, 72 and 74 to the shift register 76 is controlled by the clock signal provided by the data select circuit 82. The shift register 76 delivers the transmission signal U to the communication network 19 in synchronism with the transmission clock provided by the transmission clock generator 80.

Figure 4:
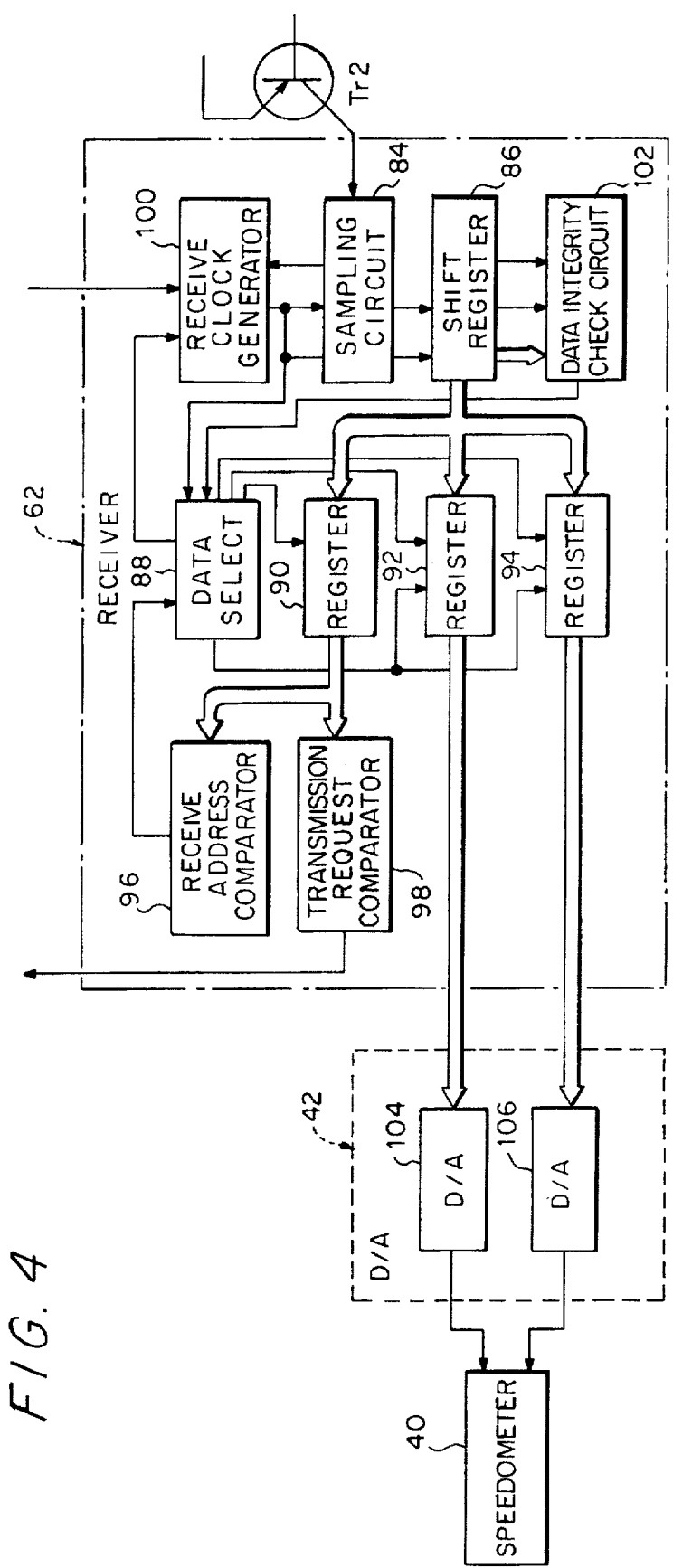
FIG. 4 is a block diagram of a receiver included in the communication circuit of FIG. 2.

FIG. 4 is a block diagram of the receiver 62. The receiver 62 comprises a sampling circuit 84 which receives signals from the communication network 19, a shift register 86 which transforms the serial input signals into parallel signals, a data select circuit 88, a register 90 which receives the communication address signal from the shift register 86 and stores the same upon the reception of a select signal from the data select circuit 88, a register 92 which receives the lower eight bits of an angular deflection signal representing the angular deflection of the indicator of the speedometer 40 from the shift register 86 in response to the select signal provided by the data select circuit 88 and stores the same, and a register 94 which stores the upper eight bits of the angular deflection signal from the shift register 86 in response to the select signal provided by the data select circuit 88.

The receiver 62 further comprises a receive address comparator 96 which compares the receive address signal of the communication address signal provided by the register 90 with a given receive address signal and delivers a signal representing the results of comparison to the data select circuit 88, and a transmission request comparator 98 which delivers a transmission start signal to the transmitter 60 when the register 90 does not provide any transmission address signal for a predetermined time. The receiver 62 also comprises a receive clock generator 100 and a data check circuit 102. The receive clock generator 100 generates a receive clock upon the reception of a receive start signal and the data check circuit 102 tests the parity of the signal delivered to the shift register 86.

The D/A converter 42 has a D/A converter 104 for converting the digital signal provided by the register 92 into a corresponding analog signal and a D/A converter 106 for converting the digital signal provided by the register 94 into a corresponding analog signal.

Figure 5:
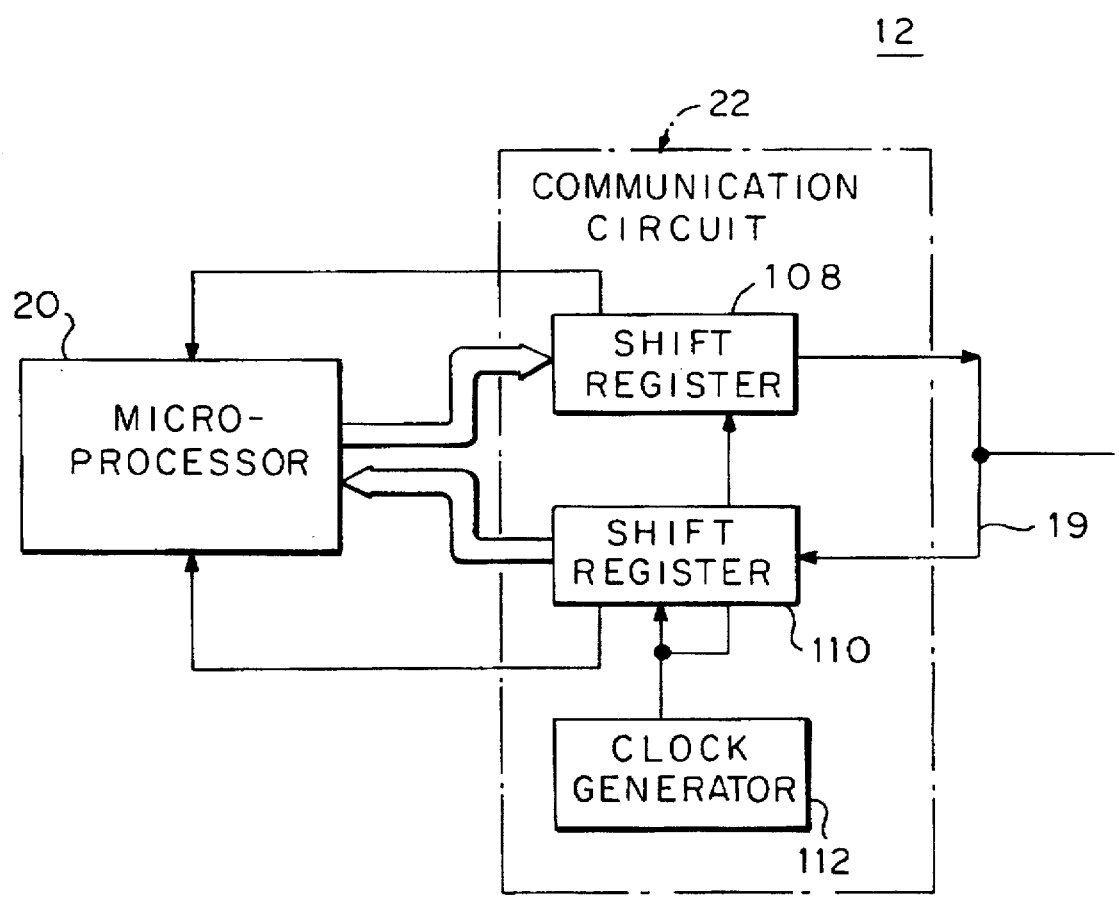
FIG. 5 is a block diagram of a central control unit.

FIG. 5 is a block diagram of the communication circuit 22 included in the central control unit 12. The communication circuit 22 comprises a shift register 108 which transforms the parallel data provided by the microcomputer 20 into serial data and delivers the serial data to the communication network 19, a shift register 110 which transforms the serial data received from the communication network 19 into parallel data and delivers the parallel data to the microprocessor 20, and a clock generator 112 which delivers a clock signal to the shift registers 108 and 110.

Figure 6:
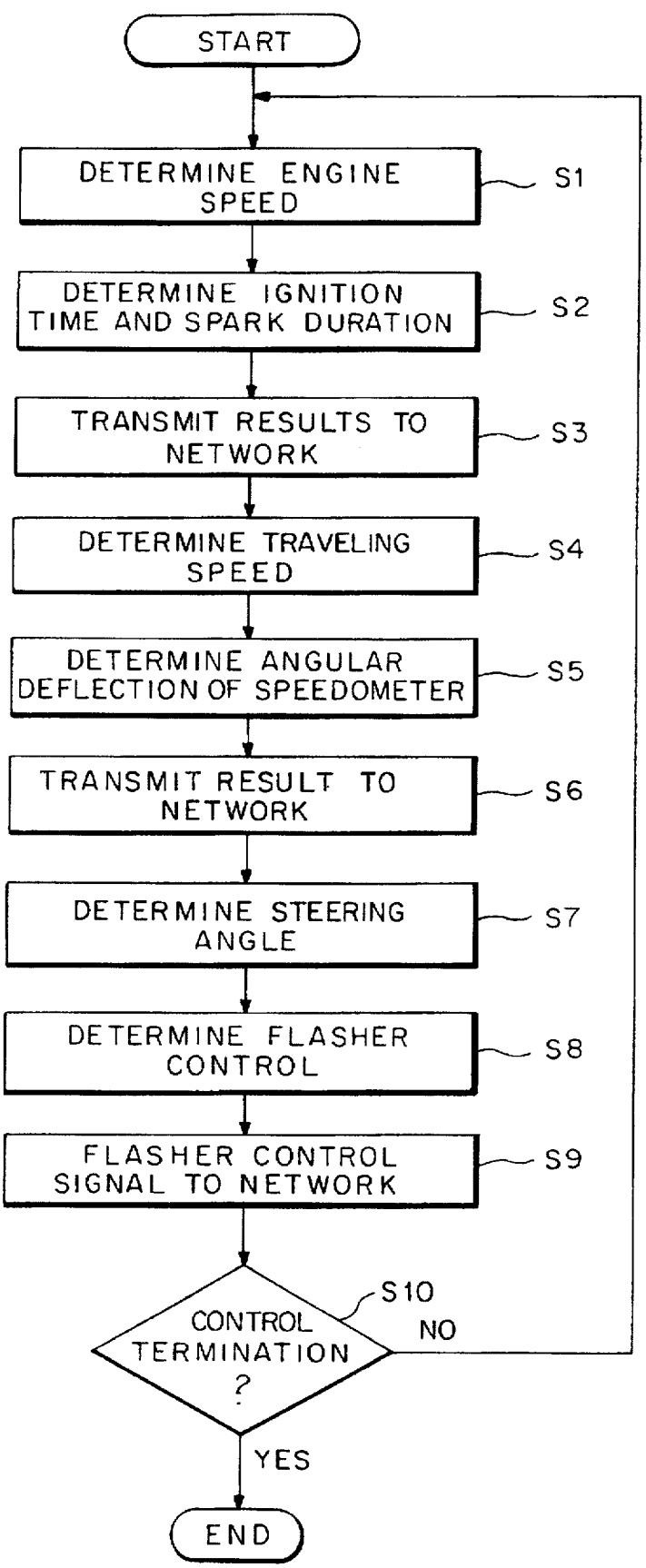
FIG. 6 is a flow chart of a main routine to be executed by the single central control unit of the electrical equipment control system of FIG. 1 to control a plurality of I/O units.

A centralized control procedure for controlling the ignition I/O unit 14, the speedometer I/O unit 16 and the flasher I/O unit 18 by the central control unit 12 in this electrical equipment control system 10 having the above-described configuration will be described hereinafter with reference to a main flow chart shown in FIG. 6.

After the engine has been started, the crank position sensor 24 delivers a reference crank position signal to the rotational frequency measuring timer 26 of the ignition I/O unit 14. The crank position signal is delivered through the communication circuit 34 to the communication network 19. The central control unit 12 reads the reference crank position signal from the communication network 19 and determines an engine speed on the basis of the reference crank position signal in step S1. Then, the central control unit 12 determines an ignition time at which the spark plug is to pass an electrical discharge, and a spark duration in step S2 by using the determined engine speed. The results of the determination are delivered to the communication network 19 in step S3.

Thereafter, the central control unit 12 reads the traveling speed signal provided by the traveling speed sensor 36 delivered to the communication network 19 by the speedometer I/O unit 16 and determines the traveling speed of the vehicle by using the traveling speed signal in step S4. Then, the central control unit 12 determines the angular deflection of the indicator of the speedometer 40 by using the traveling speed in step S5 and delivers the results of the determination to the communication network 19 in step S6.

Then, the central control unit 12 reads a steering angle signal and a steering duration signal provided by the steering angle sensor 46 delivered to the communication network 19 by the flasher I/O unit 18 and determines a steering angle by using the steering angle signal in step S7. Then, the central control unit 12 examines the steering duration to decide whether or not the flasher is to be stopped in step S8, and then delivers a flasher control signal according to the decision made in step S8 to the communication network 19 in step S9. A query is made in step S10 to see if a control termination signal is given. Step S1 and the following steps are repeated if the response in step S10 is negative, or the centralized control procedure is terminated when the response in step S10 is affirmative. Thus, the single central control unit 12 performs the centralized control of the plurality of I/O units.

Figure 7:
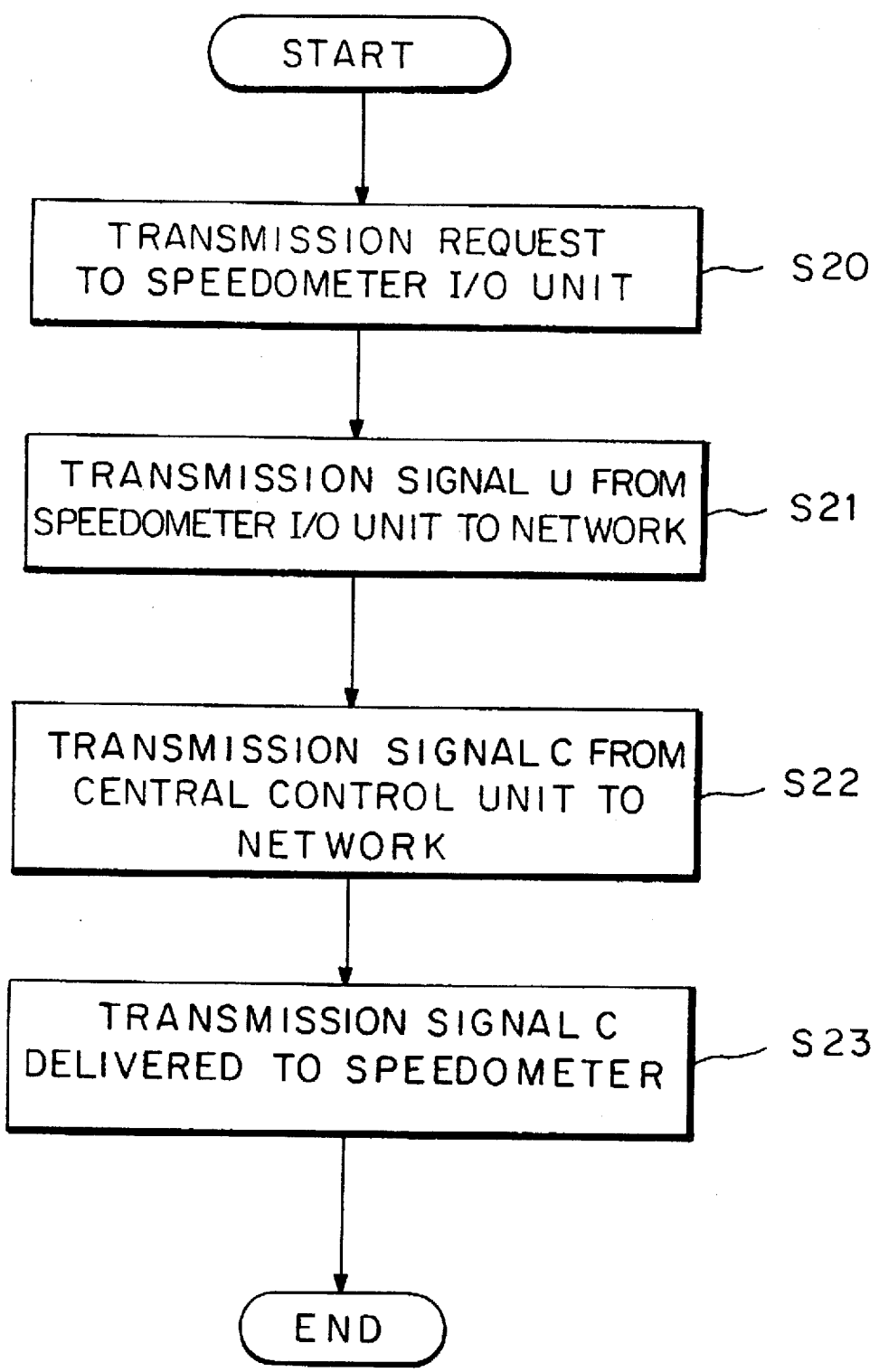
FIG. 7 is a flow chart of a routine to be executed by the central control unit of the electrical equipment control system of FIG. 1 to control a meter I/O unit.

A manner of communication between the central control unit 12 and the I/O units 14, 16 and 18 will be described with reference to FIG. 7. A transmission request signal requesting the meter I/O unit 16 to transmit a signal is delivered to the communication network 19 by the central control unit 12. The transmission request signal is delivered to the receiver 62 of the speedometer I/O unit 16 in step S20. Then, the receiver 62 delivers a transmission start signal to the transmitter 60 in response to the transmission request signal, and then in step S21, the transmitter 60 delivers a transmission signal U obtained by adding a communication address signal to the traveling speed signal provided by the traveling speed measuring timer 38 to the communication network 19.

Upon the reception of the transmission signal U from the communication network 19, the central control unit 12 determines an angular deflection signal representing the angular deflection of the indicator of the speedometer 40 by using the transmission signal U and delivers a transmission signal C obtained by adding a communication address signal to the angular deflection signal to the communication network 19 in step S22. Upon the reception of the transmission signal C from the communication network 19, the receiver 62 of the speedometer I/O unit 16 extracts the angular deflection signal from the transmission signal C and delivers the same to the D/A converter 42, and then, the D/A converter 42 converts the angular deflection signal into a corresponding analog signal and delivers the same to the speedometer 40 in step S23.

Figure 8:
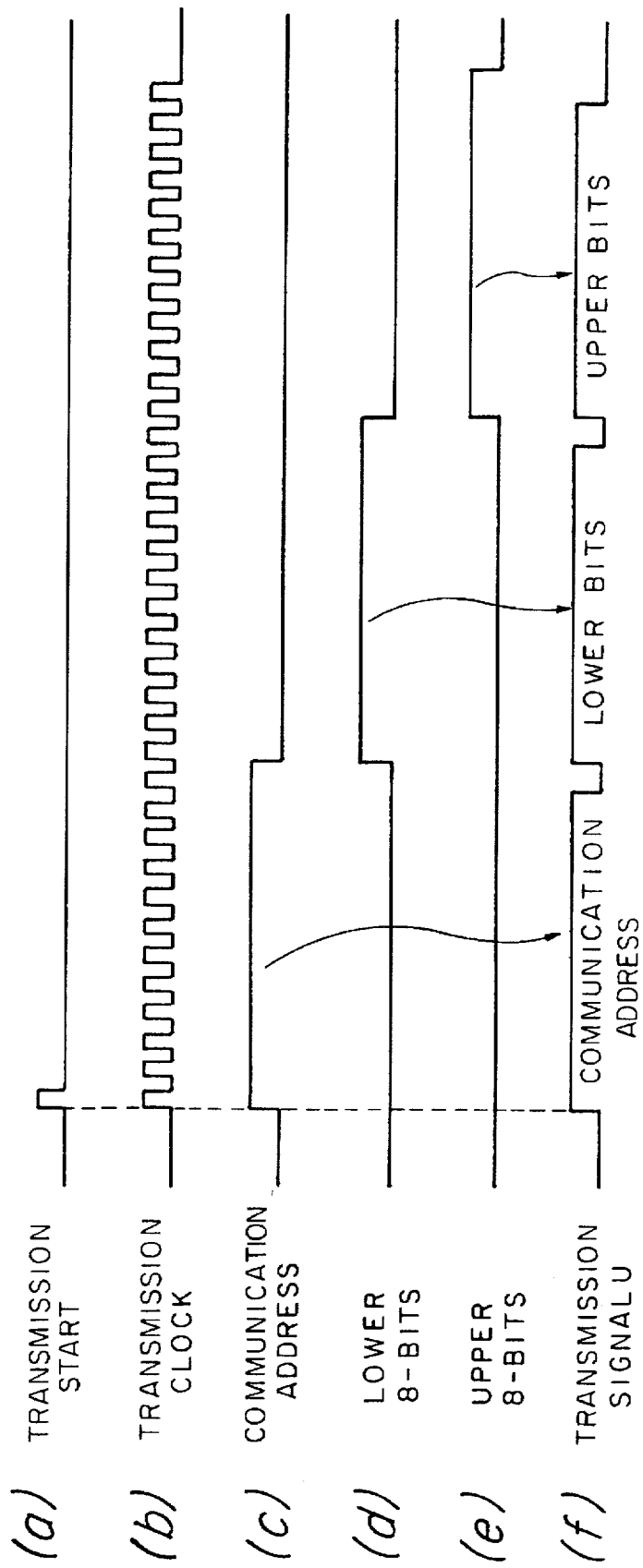
FIGS. 8(a), 8(b), 8(c), 8(d), 8(e) and 8(f) are timing charts illustrating the operation of the transmitter of FIG. 3.

A procedure by which the transmitter 60 delivers the transmission U to the communication network 19 in step S21 will be described hereinafter with reference to FIGS. 3 and 8. A transmission start signal (FIG. 8(a)) provided by the receiver 62 is applied to the registers 72 and 74 of the transmitter 60 and the control input terminal of the transmission clock generator 80, as shown in FIG. 3. Upon the reception of the transmission start signal, the register 72 stores the lower eight bits of the traveling speed signal stored in the L-capture register 64, and the register 74 stores the upper eight bits of the traveling speed signal stored in the capture register 66.

Upon the reception of the transmission start signal, the transmission clock generator 80 generates a transmission clock signal (FIG. 8(b)) synchronous with a transmission clock signal generated by the microcomputer 20 of the central control unit 12 and applies the transmission clock signal to the data select circuit 82 and the transmission shift register 76. The data select circuit 82 delivers signals sequentially to the registers 70, 72 and 74, the register 70 delivers the communication address signal (FIG. 8(c)) stored beforehand therein to the shift register 76, the register 72 delivers the lower eight bits of the traveling speed signal (FIG. 8(d)) to the shift register 76, and the register 74 delivers the upper eight bits of the traveling speed signal (FIG. 8(e)) to the shift register 76. The shift register 76 transforms the received signals into a serial signal, adds a parity bit provided by the parity signal producing circuit 78 to the serial signal to obtain a transmission signal U (FIG. 8(f)) and delivers the transmission signal U to the communication network 19.

Figure 9:
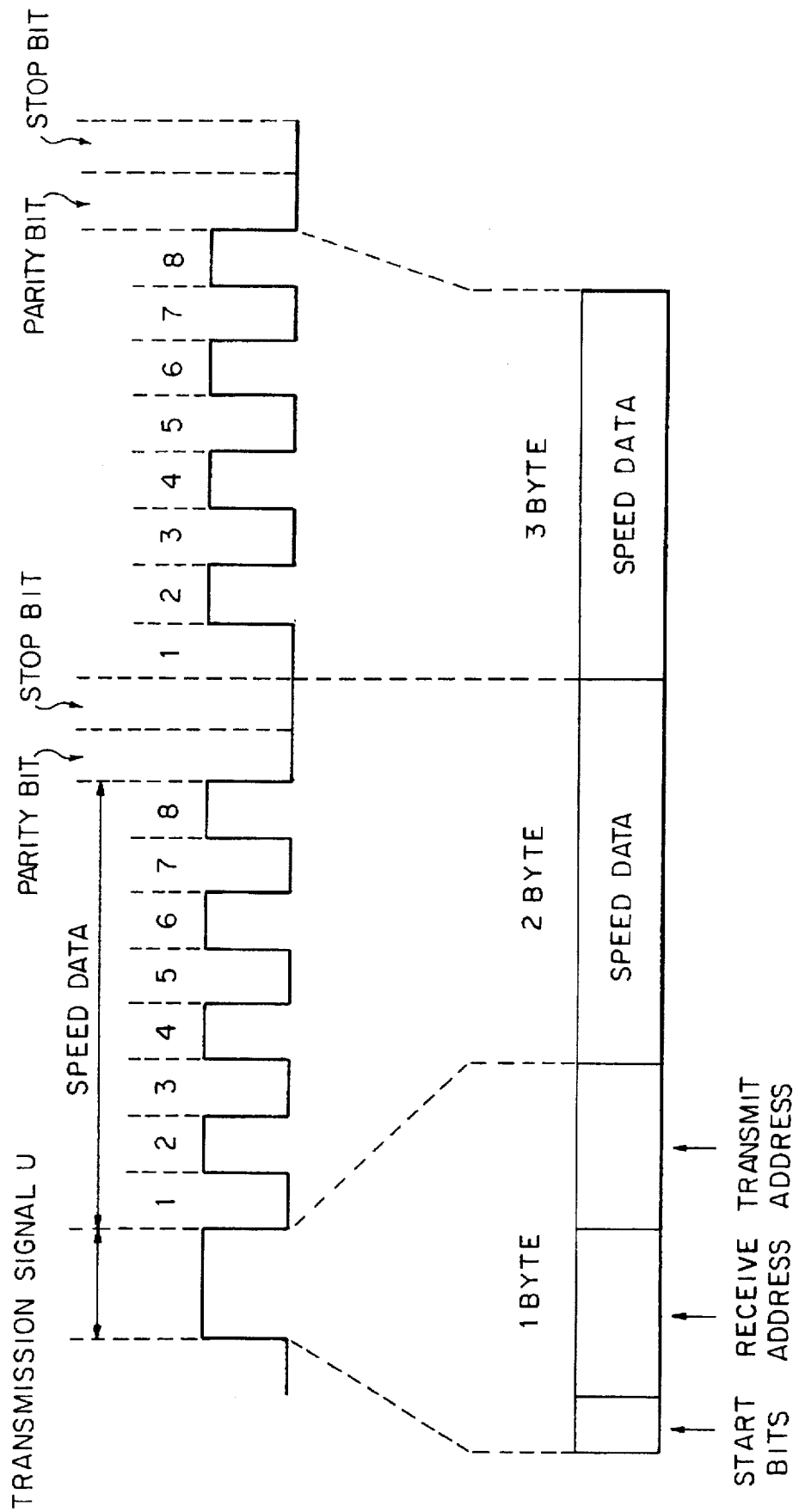
FIG. 9 is a diagrammatic view illustrating the format of signals to be delivered from the central control unit and the I/O units to a communication network.

FIG. 9 shows the format of the transmission signal U thus produced. The first byte of the transmission signal U represents the communication address signal and consists of start bits, a receive address signal and a transmit address signal. Each of the second byte and the third byte of the transmission signal U consist of traveling speed data, a parity bit and a stop bit. Suppose that the start bit is "1", the address signal for the receiving central control unit 12 is "001" and the address signal for the transmitting speedometer I/O unit 16 is "010", and the word length is eight bits. Then, the address signal for the transmission signal U is "1 0 0 1 0 1 0 0".

The operation of the central control unit for receiving the transmission signal U from the communication network 19 and delivering the angular deflection signal representing the angular deflection of the indicator of the speedometer 40 to the communication network 19 will be described hereinafter with reference to FIG. 5.

The first byte of the transmission signal U provided by the speedometer I/O unit 16 is delivered from the communication network 19 to the receiving shift register 110 of the central control unit 12. Upon the identification of the transmission signal U provided by the speedometer I/O unit 16, the microcomputer 20 reads the speed data represented by the second byte and the third byte from the shift register 110, and determines the angular deflection of the indicator of the speedometer 40 by using the speed data. A communication address signal, a parity bit and a stop bit are added to an angular deflection signal representing the determined angular deflection to produce a transmission signal C, the shift register 108 transforms the transmission signal C of a parallel format into that of a serial format, and then the central control unit 12 delivers the serial transmission signal C to the communication network 19.

The operation of the speedometer I/O unit 16 for receiving the transmission signal C delivered by the central control unit 12 to the communication network 19 and for driving the indicator of the speedometer 40 will be described hereinafter with reference to FIGS. 4 and 10(a)–(i).

Figure 10:
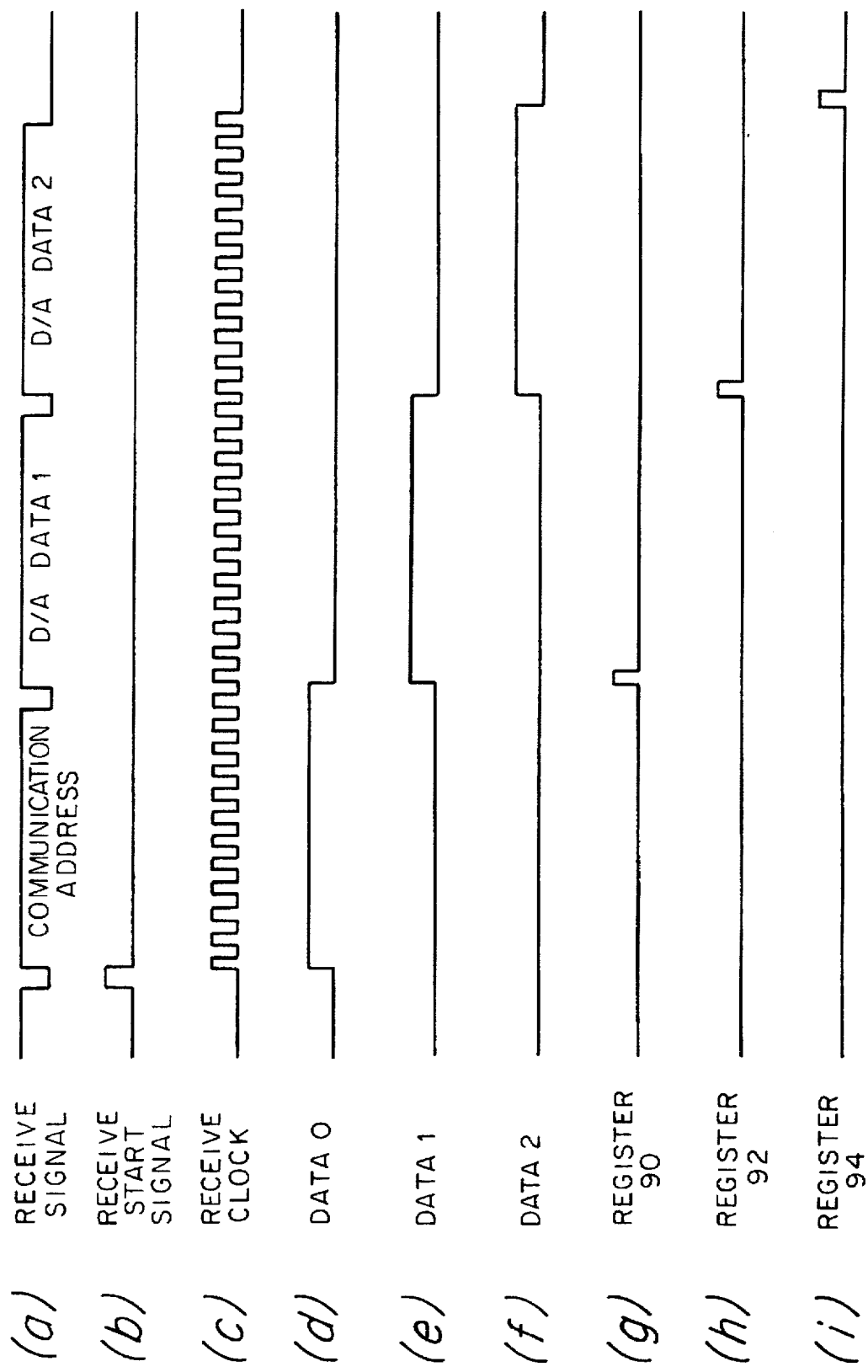
FIGS. 10(a), 10(b), 10(c), 10(d), 10(e), 10(f), 10(g), 10(h) and 10(i) are timing charts illustrating the operation of the receiver of FIG. 4.
Figure 12:
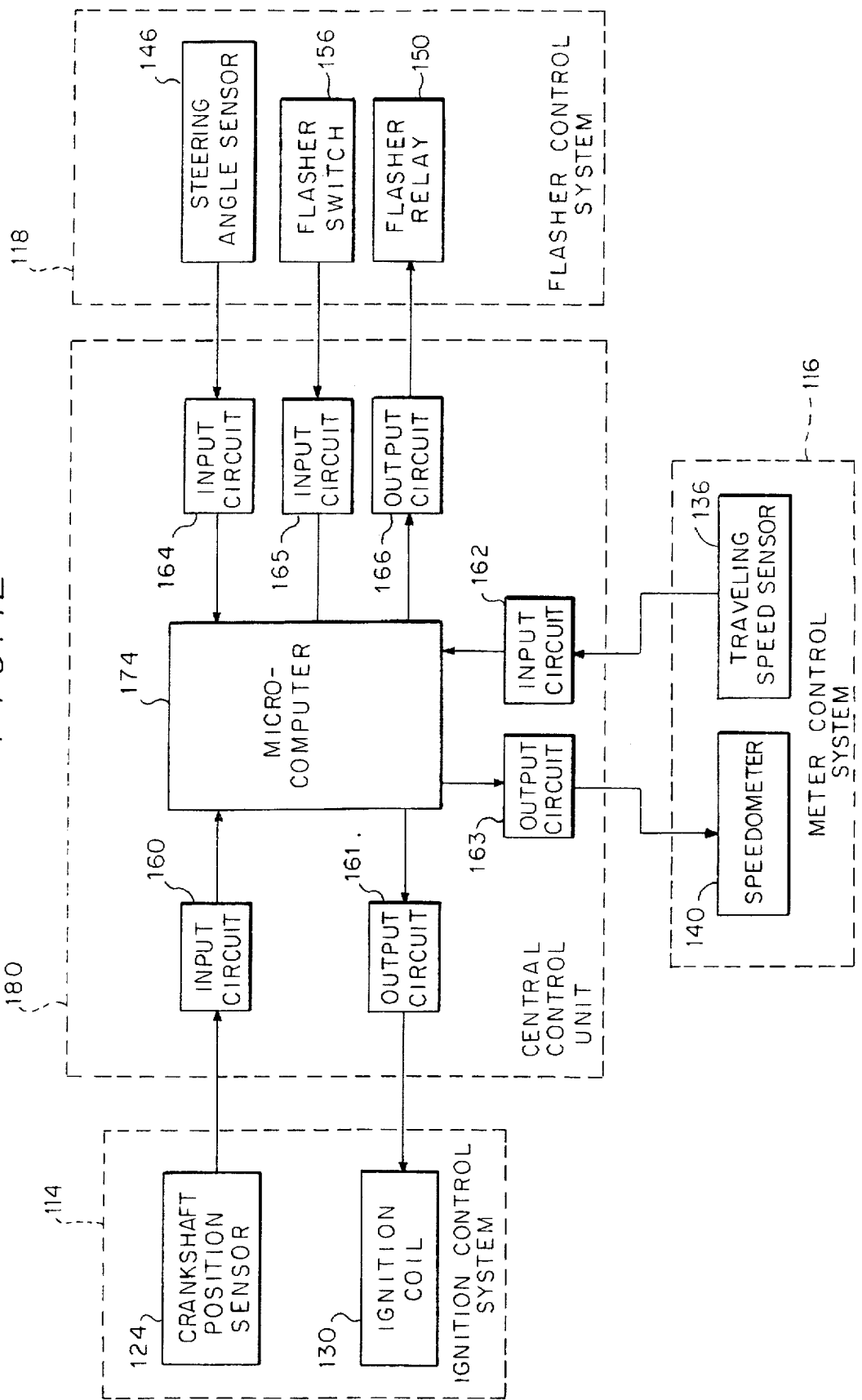
FIG. 12 is a block diagram of another conventional electrical equipment control system for controlling the electrical equipment of a vehicle.

When the transmission signal C received from the communication network 19 goes LOW (FIG. 10(a)), the sampling circuit 84 of the communication circuit 44 delivers a receive start signal (FIG. 10(b)) to the receive clock generator 100. Upon the reception of the receive start signal, the receive clock generator 100 generates a receive clock (FIG. 10(c)) and applies the same to the sampling circuit 84, the data select circuit 88 and the shift register 86. The receive clock generated by the receive clock generator 100 is synchronous with the transmission clock signal generated by the microcomputer 20.

The sampling circuit 84 operates in synchronism with the receive clock to receive the transmission signal C in the LOW state and delivers the transmission signal C to the shift register 86. The shift register 86 delivers the communication address signal included in the transmission signal C to the register 90. The register 90 receives the communication address signal (FIG. 10(d)) in response to the select signal (FIG. 10(g)) provided by the data select circuit 88 and delivers a receive address signal included in the communication address signal to the receive address comparator 96. The receive address comparator 96 compares the input receive address signal with a predetermined receive address signal. If both the receive address signals coincide with each other, the receive address comparator decides that the destination of the transmission signal C is the unit to which the receive address comparator 96 belongs and delivers a coincidence signal to the data select circuit 88.

Upon the reception of the coincidence signal, the data select circuit 88 delivers a data select signal (FIG. 10(h)) to the register 92 and delivers a data select signal (FIG. 10(i)) to the register 94. Then, the register 92 reads the lower eight bits of a parallel signal (FIG. 10(e)) representing the angular deflection of the indicator from the shift register 86 and delivers the same to the D/A converter 104, and the register 94 reads the upper eight bits of the parallel signal (FIG. 10(f)) representing the angular deflection of the indicator from the shift register 86 and delivers the same to the D/A converter 106.

The D/A converter 104 converts the input 8-bit digital signal into a corresponding analog signal and delivers the analog signal to the speedometer 40, and the D/A converter 106 converts the upper 8-bit digital signal into a corresponding analog signal and delivers the same to the speedometer 40. The indicator of the speedometer 40 is moved according to the input analog signals. The central control unit 12 communicates through the communication network 19 with the speedometer I/O unit 16 to control the angular deflection of the indicator of the speedometer 40. The central control unit also communicates with the ignition I/O unit 14 and the flasher I/O unit 18 to control the ignition coil 30 and the flasher relay 50.

As is apparent from the foregoing description, in this embodiment, the central control unit 12 is provided with the communication circuit 22, the I/O units 14, 16 and 18 are provided respectively with the communication circuits 34, 44 and 54, and the communication circuit 22, 34, 44 and 54 are interconnected by the communication network 19 for data communication, so that the centralized control of the plurality of I/O units can be achieved by the single central control unit 12.

In the above-described electrical equipment control system in accordance with the present invention for controlling the electrical equipment of a vehicle, the central control units communicates through the data communication network with the plurality of I/O units. Accordingly, the electrical equipment control system does not need a plurality of microcomputers and therefore reduces the manufacturing cost of the electrical equipment of the vehicle.

Moreover, since the I/O units provided with the communication circuits are disposed separately, the I/O port of the central control unit and the I/O units can be interconnected by a comparatively small number of lines and the central control unit can be miniaturized. Since the I/O units can readily be replaced with another I/O unit merely by disconnecting the former from the I/O port and connecting the latter to the I/O port, the efficiency of research activities for the development of an electrical equipment control system is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrical equipment control system for controlling electrical equipment of a vehicle comprising:

a plurality of input/output means, wherein each of said input/output means includes sensor output read means for reading outputs of sensors of the electrical equipment, input data producing means for producing input data on the basis of outputs of said sensor output read means, first communication means for transforming outputs of said input data producing means into signals of a predetermined transmission format, for delivering the transformed signals of the predetermined transmission format to a data communication network and for extracting electrical equipment driving signals from input signals delivered thereto via the data communication network, and driving means for driving the electrical equipment on the basis of the electrical equipment driving signals extracted by said first communication means; and central control means having second communication means respectively connected through the data communication network to said first communication means for mutual data communication with said first communication means, and control means for controlling respective electrical equipment by sending electrical equipment driving signals through said second communication means to respective, first communication means, said control means initially processing ignition control of an engine in the vehicle.

2. A vehicle control system comprising:

a control unit for controlling a plurality of electrical equipment through a system data network, said control unit including control means for generating command signals for controlling the plurality of electrical equipment in accordance with sensor data, and first communication means, coupled to said control means, for transmitting the command signals along the system data network and for receiving the sensor data from the system data network; and a plurality of I/O units, each coupled to a respective one of the plurality of electrical equipment, each of said plurality of I/O units including sensor data generating means, coupling to a respective sensor, for generating sensor data of the respective electrical equipment in accordance with a sensor input signal from the respective sensor, driving means, coupled to the respective electrical equipment, for generating a respective driving signal for driving the respective electrical equipment in accordance with the command and signals, and second communication means, coupled to a respective sensor data generating means and a respective driving means, for transmitting the sensor data along the system data network and for receiving the command signals from the system data network.

3. The vehicle control system of claim 2, wherein each of said second communication means comprises:

receiving means, coupled to the system data network, for receiving the command signals from the system data network; and transmitting means, coupled to the system data network, for transmitting the sensor data along the system data network, wherein the command signals include command data and address destination data, the address destination data indicative of a respective one of the I/O units for which a particular command signal is intended.

4. The vehicle control system of claim 3, wherein each of said receiving means comprises:

comparator means for comparing the address destination data of the command signals with a designated address of the respective I/O means and for generating and delivering a transmission start signal to a respective transmitting means upon coincidence thereof to initiate transmission of the sensor data.

5. The vehicle control system of claim 4, wherein each of said transmitting means comprises:

transmission clock generating means for generating a transmission clock for synchronizing transmission of the sensor data upon receipt of the transmission start signal from a respective receiving means; and data select means, coupled to said transmission clock means, for generating and delivering a receive inhibit signal to each of the respective receiving means to inhibit reception of the command signals during transmission of the sensor data.

6. The vehicle control system of claim 2, wherein one of the plurality of I/O units is an ignition I/O unit, one of the electrical equipment is an ignition coil, one of the sensors is a crankshaft position sensor for sensing a position of a crankshaft of the vehicle, one of the sensor data generating means is a rotational frequency measuring timer for generating sensor data of a predetermined format indicative of the rotational frequency of the crankshaft, and one of the driving means is an ignition timer for generating an ignition signal as a driving signal to control said ignition coil.

7. The vehicle control system of claim 2, wherein one of the plurality of I/O units is a speedometer I/O unit, one of the electrical equipment is a speedometer, one of the sensors is a speed sensor for sensing a traveling speed of the vehicle, one of the sensor data generating means is a traveling speed measuring timer for generating sensor data of a predetermined format indicative of the traveling speed of the vehicle, and one of the driving means is a digital/analog converter for converting a command signal into an analog deflection signal for driving said speedometer.

8. The vehicle control system of claim 2, wherein one of the plurality of I/O units is a flasher I/O unit, one of the electrical equipment is a flasher relay, one of the sensors is a steering angle sensor for sensing a steering angle of a vehicle steering wheel, one of the sensor data generating means is an analog/digital converter for converting an output of said steering angle sensor into sensor data, and one of the driving means is a flasher driver for generating a flasher signal as a drive signal to control said flasher relay.

9. The vehicle control system of claim 3, wherein each of the receiving means further comprises:
   data check means for checking the command data received from the system data network.

10. The vehicle control system of claim 3, wherein each of the receiving means further comprises register means for temporarily storing command signals received from the system data network.

11. The vehicle control system of claim 3, wherein each of the transmitting means further comprises means for generating a data check signal that is transmitted with the respective sensor data along the system data network.

12. The vehicle control system of claim 3, wherein each of the transmitting means further comprises register means for temporarily storing respective sensor data before transmission of the respective sensor data along the system data network.

13. The electrical equipment control system according to claim 1 wherein said plurality of input/output means includes an ignition input/output means and other input/output means; and
   wherein said central control means initially communicates with said ignition input/output means.

14. The electrical equipment control system according to claim 13 wherein said central control means communicates, initially after the start of the engine, with said ignition input/output means for processing the ignition control and then communicates successively with said other input/output means.

15. The electrical equipment control system according to claim 13 wherein said central control means reads, initially after the start of the engine, a crank position of the engine from a crank position sensor connected with said ignition input/output means and then calculates an ignition time and delivers the ignition time to the ignition input/output means.

16. The electrical equipment control system according to claim 14 wherein said central control means reads, initially after the start of the engine, a crank position of the engine from a crank position sensor connected with said ignition input/output means and then calculates an ignition time and delivers the ignition time to the ignition input/output means.

17. The electrical equipment control system according to claim 13 wherein said ignition input/output means includes a timing signal generator for receiving signals from a crank position sensor and an ignition timer for applying ignition signals to an ignition coil,
   wherein said ignition timer applies the ignition signals on the basis of an ignition timing signal provided by the timing signal generator and, after the engine has been started, on the basis of an ignition time calculated by said central control means and transmitted through the data communication network.

18. The electrical equipment control system according to claim 17 wherein said ignition input/output means includes a timing signal generator for receiving signals from a crank position sensor and an ignition timer for applying ignition signals to an ignition coil,
   wherein said ignition timer applies the ignition signals on the basis of an ignition timing signal provided by the timing signal generator and, after the engine has been started, on the basis of an ignition time calculated by said central control means and transmitted through the data communication network.

19. The electrical equipment control system according to claim 13 wherein said central control means, initially after the start of the engine, calculates an ignition time datum and transmits the calculated ignition time datum to said ignition input/output means and then calculates and transmits other calculated data to said other input/output means.

* * * * *